318-135.
12-24-74 XR 3,857,078 SR

United States Patent [19] [11] 3,857,078
Sawyer [45] Dec. 24, 1974

[54] ACTUATING SYSTEM

[76] Inventor: Bruce A. Sawyer, 20120 Allentown Dr., Woodland Hills, Calif. 91364

[22] Filed: Mar. 26, 1973

[21] Appl. No.: 344,563

Related U.S. Application Data

[63] Continuation of Ser. No. 157,100, June 28, 1971, abandoned.

[52] U.S. Cl. .................. 318/608, 318/687, 318/135
[51] Int. Cl. .............................................. G05b 1/01
[58] Field of Search ........... 318/135, 171, 175, 603, 318/608, 685, 687

[56] References Cited

UNITED STATES PATENTS

| | | | |
|---|---|---|---|
| 2,700,127 | 1/1955 | Sawyer | 318/175 |
| 3,045,154 | 7/1962 | Pentecost | 318/171 X |
| 3,457,482 | 7/1969 | Sawyer | 318/685 X |
| 3,549,966 | 12/1970 | Wilson | 318/135 |
| 3,638,093 | 1/1972 | Ross | 318/135 X |

*Primary Examiner*—G. Z. Rubinson
*Attorney, Agent, or Firm*—Ellsworth R. Roston

[57] ABSTRACT

A synchronous motor is provided which includes a platen and a head disposed in displaced relationship to the platen for movement along a single axis or a pair of coordinate axes relative to the platen. The synchronous motor may operate on the basis of variable linear reluctance. Pickoff means may be disposed on the head to measure the displacement of the head relative to the platen along the single axis or the pair of coordinate axes. The signals from the pickoff means are introduced to actuator means on the head to obtain continued displacements of the head relative to the platen along the single axis or the pair of coordinate axes. Signals may also be introduced to the actuator means to represent force signals for producing a controlled acceleration of the head relative to the platen along the single axis or the pair of coordinate axes.

In another embodiment, signals representing desired displacement along the single axis or the pair of coordinate axes are combined with signals representing actual displacement of the head relative to the platen along these axes to produce error signals for use in a closed loop servo to drive the head to the desired displacements. Servo means are also provided for preventing rotation of the head about the coordinate axes.

24 Claims, 7 Drawing Figures

PATENTED DEC 24 1974

3,857,078

SHEET 4 OF 4

ACTUATING SYSTEM

RELATED APPLICATION

This is a continuation of my application Ser. No. 157,100, filed June 28, 1971, which is now abandoned.

This invention relates to a system for providing a synchronous motor which is movable in a linear direction or in a planar configuration on a controlled basis. The invention also relates to systems utilizing such a synchronous motor in a closed loop servo for providing controlled displacements of a head relative to a platen in accordance with signals representing desired displacements of the head relative to the platen. The invention further relates to systems utilizing such a synchronous motor in a closed loop servo for preventing any rotation of the head relative to the platen about an axis substantially normal to the surface of the platen.

U.S. Pat. No. 2,700,127 issued to me on Jan. 18, 1955, discloses a system including a rotational synchronous motor and a pair of resolvers coupled to the rotor of the motor for generating signals in accordance with the movement of the rotor. The amplified signals generated by the resolver are introduced to stator windings in the motor to control the further rotation of the rotor. By providing such an arrangement, a motor is provided with low power losses and with a substantially constant torque over a wide range of speeds. In orther words, a torque generating system is disclosed which has torque and speed characteristics similar to those of a direct current motor whose field current is held substantially constant.

In U.S. Pat. No. 3,457,482 issued to me on July 22, 1969, a system is disclosed for positioning a head at any desired position along the surface of a platen. The system disclosed and claimed in U.S. Pat. No. 3,457,482 has certain important advantages. For example, it provides a head which is disposed in displaced but contiguous relationship to a platen and which is movable along the platen simultaneously and independently along two coordinate axes. It further provides a system which is simultaneously able to drive the head and reckon the position of the head at each instant. Furthermore, the driving of the head and the reckoning as to the position of the head may be provided by the same means. The driving of the head by the system disclosed in U.S. Pat. No. 3,457,482 may be accomplished on an open loop basis.

In a simple approach to the system constituting this invention, a system using the principles of U.S. Pat. No. 2,700,127, in combination with the drive system of U.S. Pat. No. 3,457,482, is provided. In this way, a platen is provided and a head is disposed in contiguous relationship to the platen and is movable, or is provided with forces for moving the head, along a single axis or a pair of coordinate axes relative to the platen. Pickoffs are provided on the head for cooperating with the platen to produce signals representing the displacement of the head along the single axis or the pair of coordinate axes. These signals are introduced to actuator means to produce a drive of the pickoff means by the actuator means in accordance with the characteristics of the signals. The signals from the pickoff means may also be combined with signals representing force for obtaining controlled accelerations of the head along the single axis or the pair of coordinate axes.

Although the simplified approach to the system constituting this invention utilizes the pickoff signals or the pickoff signals in combination with the signals representing force to control the movement of the head relative to the platen, a typical complete system utilizes signals representing desired displacement along a single axis or the coordinate axes. These signals representing desired displacement are combined with the pickoff signals representing actual displacement to produce error signals representing any differences between the desired and actual displacements. These error signals are used in a closed loop servo to control the forces for producing subsequent displacements of the head along the coordinate axes so that the actual displacement of the head corresponds to the desired displacement.

The pickoffs are provided in pairs for each coordinate axis with the heads in each pair being displaced from each other in a direction transverse to the displacement which the pickoffs measure. Because of this, any rotation of the head causes a displacement in one direction of one pair of pickoffs and a displacement in the opposite direction of the other pair of pickoffs. The differences in displacement between the two pairs of pickoff are used in a closed loop servo to inhibit any rotation of the head about any axis substantially perpendicular to a surface including the pair of coordinate axes.

Although the invention is described as including planar members, it will be appreciated that other types of members may be used and that the coordinate axes may be other than coordinate, particularly when a closed loop servo is used to obtain a movement of the head in accordance with signals representing desired displacement. For example, the movement of a head in cylindrical coordinates may be obtained with a closed loop servo system which provides signals representing desired displacement. Furthermore, although the head is described as being magnetic, other types of heads such as pneumatic may also be used without departing from the scope of the invention.

Other objects of my invention will become apparent as the description proceeds in connection with the accompanying drawings of which:

FIG. 1 is a plan view schematically illustrating a plotter head which may be utilized with the system of the invention;

FIG. 2*a* is a schematic drawing illustrating pickoff units which may be used in the system of the invention;

FIG. 2*b* is a schematic drawing illustrating actuator units of the plotting head with which the system of the invention may be utilized;

Briefly described, the system of the invention includes a platen and a head disposed in spaced but contiguous relationship to the platen and movable relative to the platen. Pickoff means are disposed on the head to sense the displacement of the head relative to the platen and actuator means are also disposed on the head to produce forces for driving the head relative to the platen along the single axis or the pair of coordinate axes. The actuator includes at least one pair of actuator units to enable control along a single axis, two pairs of such units may be used for two-axis control. A pickoff unit is positioned proximate to the platen to move with the actuator and is provided with at least one pair of pickoffs for a single axis and at least one other or another pair of pickoffs for a pair of coordinate axes. One unit of each pickoff pair cooperates with the platen to produce a first signal having a first trigonometric function and the other unit of each pair cooperates with the platen to produce a second signal whose envelope is displaced in phase quadrature from the first trigonometric function. In one embodiment, the system of the invention operates in response to the pickoff signals or in response to the pickoff signals in combination with signals representing force to control the operation of the actuator means in positioning the head relative to the platen.

In another embodiment, a pair of trigonometric signals displaced in phase quadrature from each other are provided to indicate desired displacement of the head relative to the platen along a single axis. These signals are compared with the pickoff signals for the single axis to provide error or positioning control signals for the actuator units. The positioning control signals are used in a closed loop servo to control the operation of the actuator units so that the actual displacements of the pickoff units correspond to the desired displacements of the pickoff units. Where the displacement of the head relative to the platen is to be controlled along a pair of coordinate axes, a second pair of trigonometric signals having a quadrature displacement in phase is compared with the signals from a second pair of pickoff units to produce positioning control signals for controlling the operation of the actuator units for the second coordinate axis.

Rotation of the actuator about an axis normal to the actuator axes is prevented by means of an anti-rotation servo control which utilizes at least one pair of pickoffs positioned on opposite sides of the head to generate signals in accordance with any actuator rotation. These signals are appropriately processed and utilized to drive or modify the rectilinear drive of oppositely positioned actuator heads to counteract any tendency on the part of the head to rotate.

Figure 1:
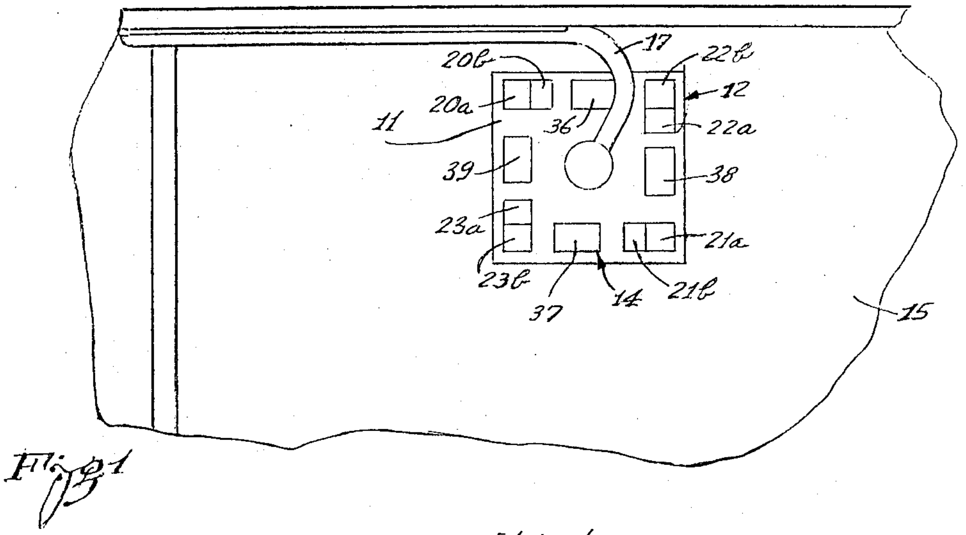
Figure 2A:
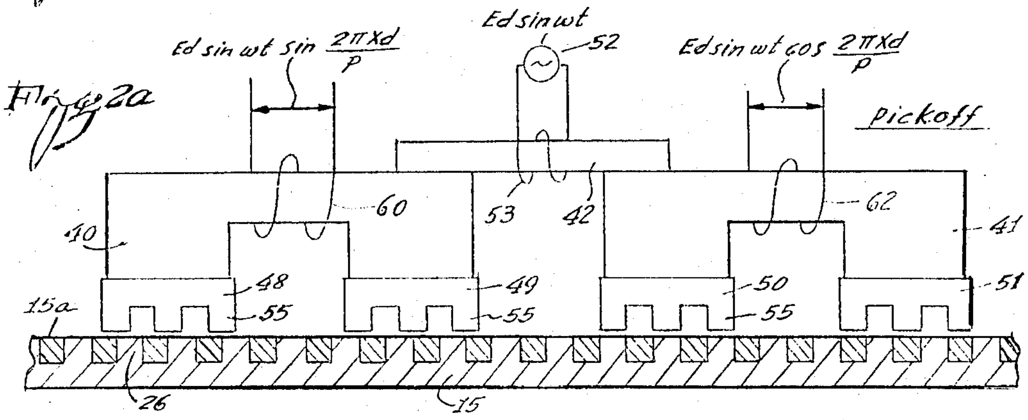
Figure 2B:
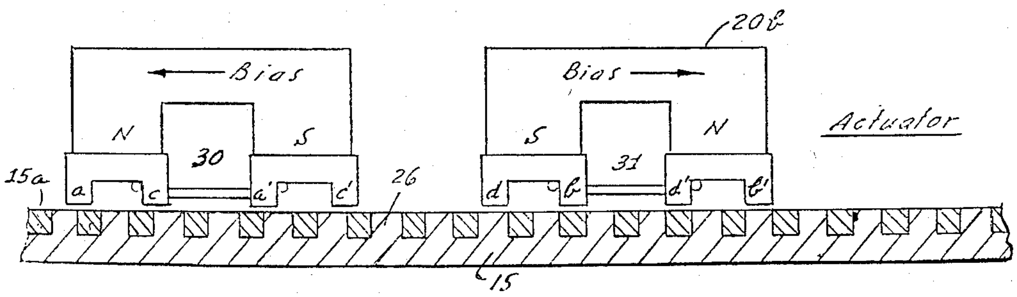

Referring now to FIGS. 1, 2*a* and 2*b*, a platen 15 and a head unit 11 are provided. Head unit 11 includes an actuator assembly 12 and a pickoff assembly 14 supported thereon. The actuator assembly 12 and pickoff assembly 14 are preferably magnetic (such as disclosed and claimed in U.S. Pat. No. 3,457,482 issued to me on July 22, 1969) but other types of actuator assemblies 12 and pickoff assemblies 14 may be used without departing from the scope of the invention. For example, pneumatic assemblies such as disclosed in application Ser. No. 101998 filed by me on Dec. 28, 1970, now U.S. Pat. No. 3720056 may also be used. Head unit 11 is supported in close proximity to platen member 15 on the air bearing formed between the opening surfaces of the head member and the platen. This bearing is established by means of a pneumatic supply fed through line 17.

Actuator assembly 12 may include two similar actuators 20*a*, 20*b*, and 21*a*, 21*b*, preferably magnetic, for controlling linear movement along the x-axis, and two actuators 22*a*, 22*b* and 23*a*, 23*b*, preferably magnetic, for controlling linear movement along the *y*-axis. The actuators such as the actuators 20*a*, 20*b* are constructed in a manner similar to that disclosed in detail in U.S. Pat. No. 3,457,482. Although two actuators are preferably included for each axis, a single actuator 20*a*, 20*b* may also be provided for each axis. Each of the actuators is provided with a pair of poles, the actuator 20*a* being provided illustratively with teeth *a* and *a'* having a similar disposition relative to the teeth on the platen and with teeth *c* and *c'* having a similar relationship but displaced from the teeth *a* and *a'* relative to the teeth on the platen.

The platen 15 may be formed of a magnetic material and may have spaced parallel grooves 15*a* formed therein. The grooves 15*a* may be filled with plastic, there being two sets of mutually orthogonal grooves which are parallel to the *x* and *Y* positioning axes, respectively. The zones or teeth of magnetic material 26 may project upwardly between the grooves. The zones or teeth of magnetic material 26 may have the same pitch as the teeth in the actuators.

As fully explained in my U.S. Pat. No. 3,457,842, actuators 20*a* and 20*b* magnetically position the head, in which they are mounted, along platen 15 in response to successive pulsating current signals applied in one polarity or the other to magnet coils 30 and 31. An analysis of the actuator of FIG. 2*b* will indicate that this device operates as a two-phase linear synchronous motor which can be linearly positioned by means of a pair of signals having a trigonometric function and applied to magnetic coils 30 and 31. These currents may be quadrature related to provide sine and cosine signals. Reversal of direction of movement may be achieved by effecting a 180° phase reversal of one of these signals by rotating the signals.

Pickoff assembly 14 includes a pair of oppositely positioned pickoffs 36 and 37 for the *x*-axis and a second pair of pickoffs 38 and 39 for the *y*-axis. All of the pickoffs may be similar to each other, one embodiment of these (pickoff 36) being illustrated in FIG. 2*a*. When the pickoffs are magnetic, pickoff unit 36 may include first and second magnetic cores 40 and 41 joined together by a magnetic cross-piece 42. The magnetic cores have pole pieces 48–51, these pole pieces being grooved to form teeth 55 which may correspond in pitch to the teeth 26 formed in platen 15. If the distance between the centers of adjacent teeth 26 is designated by *p* and represents 360° of displacement, it can be seen that the teeth of pole pieces 48 and 49 are offset from the teeth of pole pieces 50 and 51 by *p*/4 or 90 space degrees and that the teeth of pole pieces 48 and 49 and the teeth of pole pieces 50 and 51 are respectively offset from each other by *p*/2 or 180°. Although a quadrature phase system formed by four pole pieces may be preferred, any polyphase system with at least 3 pole pieces may be used, the angular relationship between the different phases being dependent upon the number of pole pieces.

The reluctance between the teeth of the pole pieces and the teeth of the platen and thus the flux therebetween varies as a function of the linear positioning of the pickoff pole pieces relative to the platen. Thus, for example, pole piece 50 is shown in FIG. 2*a* in a position of minimum reluctance relative to the teeth on the platen so that a maximum flux is produced in the pole piece 50 while pole piece 51 is shown in a position of maximum reluctance relative to the teeth on the platen so that a minimum flux is produced in the pole piece 51. The pole pieces 48 and 49 are shown in FIG. 2*a* in a position providing for an intermediate production of flux. It thus can be seen that the flux in cores 40 and 41 will vary in accordance with the linear positioning of the pickoff, the fluxes in cores 40 and 41 being in a quadrature relationship with each other. The cores may be excited with a carrier excitation signal, $E_d$sin t supplied to coil 53 from signal source 52, where $E_d$ represents the amplitude of the carrier signal and $\omega$ represents the frequency of the carrier signal. This carrier signal may have a frequency in the order of 50 kilohertz. This signal is modulated in accordance with the variations in flux in cores 40 and 41. Pickoff secondary coil 60 which is wound around core 40 thus has an output which may be represented as follows:

$$E_d \sin\omega t \, \sin(2\pi X_d/p) \quad (1)$$

where $p$ is the pitch of the teeth (the distance between the centers of adjacent teeth), and $x_d$ represents the displacement of the pickoff relative to the platen along the $x$-axis.

The output of coil 62 which is wound around core 41 has a modulation component in quadrature relationship with the output of coil 60 and may be represented as follows:

$$E_d \sin\omega t \, \cos(2\pi X_d/p) \quad (2)$$

It thus can be seen that the pickoffs provide quadrature-related output signals which are provided with periodic relationships in accordance with the actual displacement of the head along the platen. One pair of quadrature-related signals is provided by the pickoffs for the $x$-axis and a second pair of quadrature-related signals is provided by the pickoffs for the $y$-axis.

Figure 3:
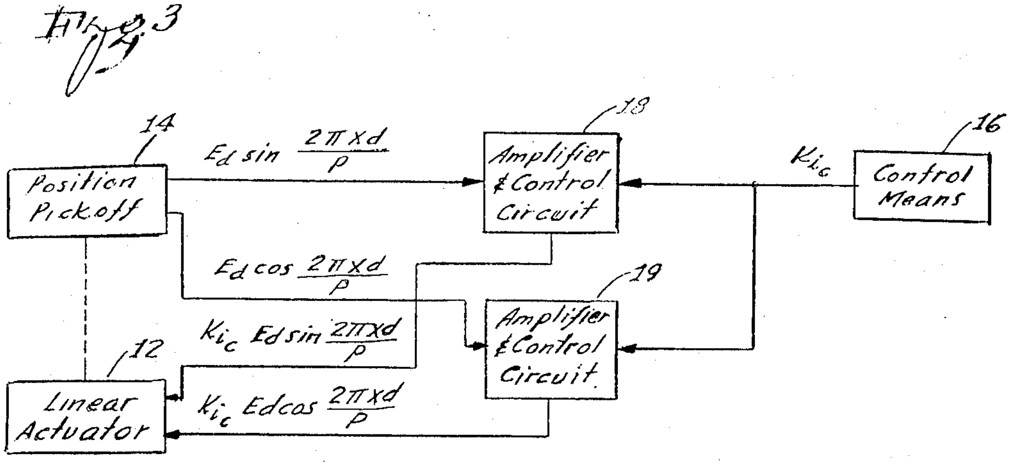
FIG. 3 is a block diagram illustrating the basic operation of a simplified system of the invention.

Referring now to FIG. 3 the basic operation of a simplified form of the system constituting this invention is illustrated to provide a movement of the head relative to the platen along a single axis. In this simplified form of the system, the actuators 12 are driven along the single axis in accordance with the quadrature-related signals representing the displacement of the pickoff relative to the platen along the single axis such as the x-axis. As previously described, the quadrature-related signals are represented as $E_d \sin(2\pi xd/p)$ and $E_d \cos(2\pi xd/p)$. These signals are amplified as at 18 and 19 and are introduced to the actuator 12 to obtain forces for a driving of the head by the actuator in accordance with these signals.

In addition to the signals from the pickoffs 14 command signals may also be provided by control means 16. These command signals represent a force control to provide a controlled acceleration of the head relative to the platen. The command signals may be represented as $Ki_c$ where $K$ is a constant and $i_c$ = a current for producing acceleration. The command signal is introduced to each of the amplifier and control circuits 18 and 19 from control means 16. The amplifier and control circuits 18 and 19 multiply the signal $Ki_c$ and the pickoff signals from the pickoffs 14. Amplifier and control circuits 18 and 19 thus feed drive currents $Ki_cE_d \sin 2\pi x_d/p$ and $Ki_c E_d \cos 2\pi x_d/p$ respectively to the associated actuator coils of linear actuator 12. The linear actuator thus is operated in response to quadrature-related signals representing the position of the pickoffs and is accelerated in accordance with the command signal $Ki_c$.

Figure 4:
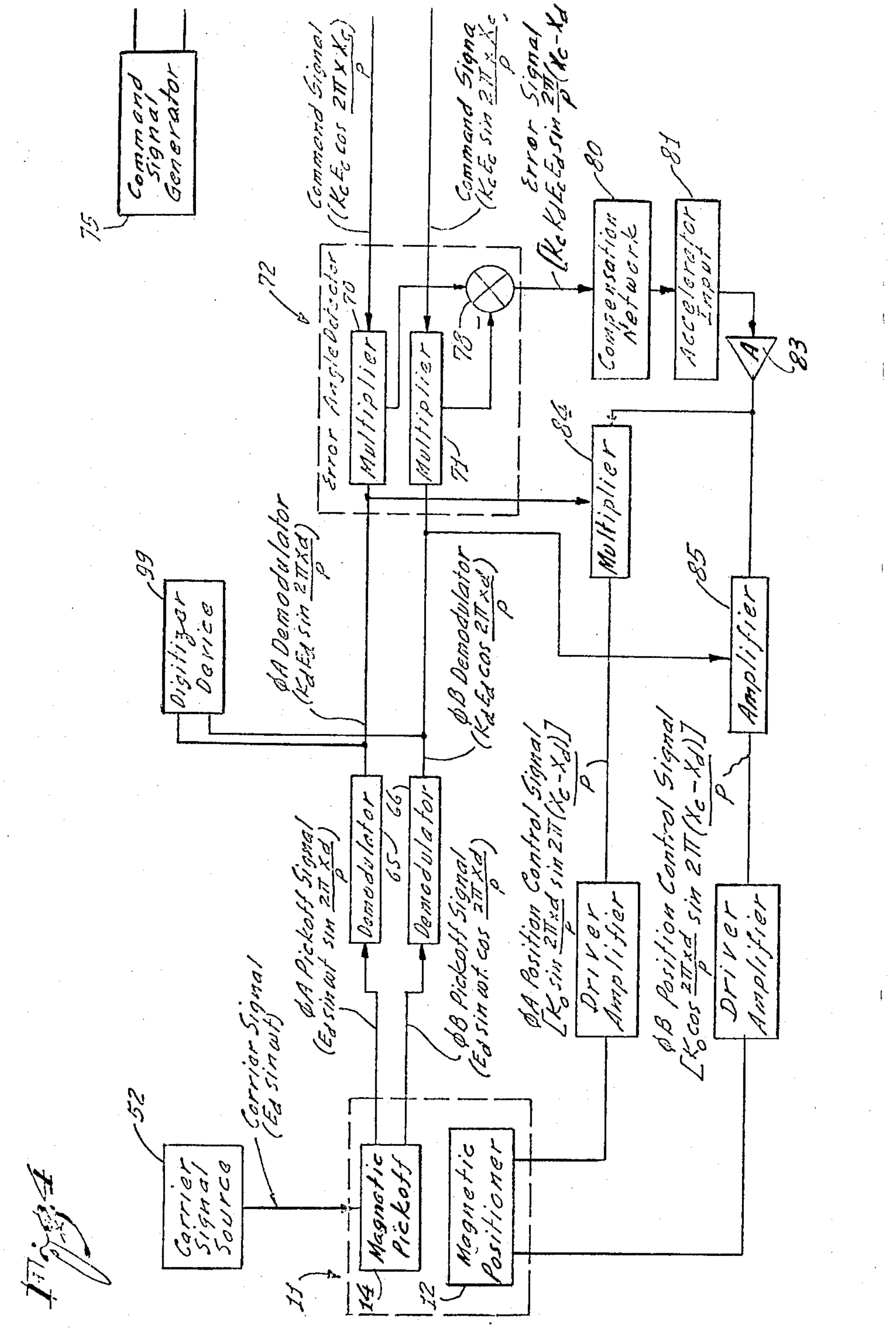
FIG. 4 is a schematic drawing illustrating the operation of control for one axis of a closed loop system constituting one embodiment of the invention.

Referring now to FIG. 4, the operation of one embodiment of a closed loop control system of the invention is schematically illustrated for controlling movement of the head relative to the platen along a single axis. Only a single one of the control loops for one of the axes ($x$-axis) is shown in FIG. 4, similar control loops being provided for the other control functions. In the embodiment shown in FIG. 4, the actual displacement of the head unit along the $x$-axis is compared to the desired displacement of the head unit along the $x$-axis to generate an error signal. This error signal is used in a servo constituting a closed loop to produce a movement of the head unit along the $x$-axis so that the actual displacement of the head unit corresponds closely to the desired displacement.

In the embodiment shown in FIG. 4, magnetic pickoffs 14 receive a carrier signal $E_d \sin\omega t$ from carrier signal source 52 and in accordance with the positioning of head 11 generate quadrature related pickoff signals as set forth in equations (1) and (2), respectively. These are designated the "phase A" and "phase B" pickoff signals. The phase A pickoff signal is demodulated in demodulator 65, to produce signals represented as $K_dE_d \sin 2\pi xd/p$ while the phase B pickoff signal is demodulated in demodulator 66 to produce signals represented as $K_dE_d \cos 2\pi xd/p$. As will be appreciated, $K_d$ is a constant. The outputs of demodulators 65 and 66 which represent the quadrature related pickoff signals are fed to multipliers 70 and 71 of error angle detector 72.

Command generator 75 provides signals representing the desired displacement of head relative to the platen. Fed to multiplier 70 from command signal generator 75 is a command signal as follows:

$$K_cE_c \cos(2\pi x_c/p \quad (3)$$

where $x_c$ represents the displacement command, $E_c$ represents the peak voltage of the command signal and $K_c$ is a constant signal factor. This signal is multiplied in multiplier 70 with the A pickoff signal, which has been designated as $K_dE_d \sin 2\ x_d/p$. Accordingly, the output from the multiplier 70 may be represented as $K_cE_cE_d \cos 2\pi x_c/p \sin 2\pi x_d/p$. Fed from command signal generator 75 to multiplier 71 is the following command signal:

$$K_cE_c \sin 2\pi x_c/p \quad (4)$$

This signal is multiplied in the multiplier 71 with the B pickoff signal, which has been designated as $K_dE_d \cos 2\pi x_d/p$. The output from the multiplier 71 may be accordingly represented as $K_cE_cE_d \sin(2\pi x_c/p) \cos(2\pi x_d/p$.

The outputs of multipliers 70 and 71 are fed to summing device 78, the output of multiplier 70 being subtracted from the output of multiplier 71. It can be shown by a simple trigonometric analysis that the subtraction in the summing network 78 of the signals in the multiplier 70 from the signals in the multiplier 71 results in an angle signal.

$$K_c K_d E_c E_d \sin 2\pi (x_c - x_d)/p \quad (5)$$

Figure 6:
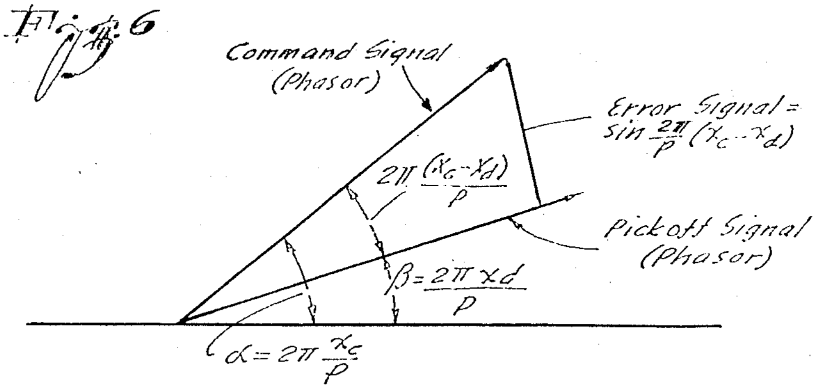
FIG. 6 is a vector drawing illustrating the operation of the system shown in FIG. 4.

FIG. 6 illustrates the significance of the trigonometric function illustrated immediately above in equation (5). As will be seen in FIG. 6, the desired displacement $2\pi x_c/p$ is represented by an angle $\alpha$ and is produced by the command signal generator 75 in FIG. 4. The actual displacement $2\pi x_d/p$ is produced by the magnetic pickoff 14 in FIG. 4 and is represented by the angle $\beta$ in FIG. 6. The difference between the desired and actual displacements of the head is represented by the angle $\alpha-\beta$, which has a value of $2\pi(x_c-x_d)/p$. Since $\sin 2\pi(x_c-x_d)/p$ is practically the same as $2\pi(x_c-x_d)$ for small values of the angle represented by $2\pi(x_c-x_d)/p$, the value of $\sin 2\pi(x_c-x_d)/p$ may be considered as constituting the error or position control signal for controlling subsequent movements of the head relative to the platen so that the actual displacement of the head will correspond to the desired displacement of the head.

The output of summing device 78 is fed to compensation network 80 which can be a conventional servo system lead-lag damping network which is designed to stabilize the servo loop. The output of compensation network 80 is amplified by means of amplifier 83 and is fed through an acceleration input 81 to multipliers 84 and 85. The error signal is multiplied by the "phase A" demodulated pickoff signal, as modified by the steady state error signal as follows:

$$K_o \sin (2\pi x_d/p) \sin (2\pi(x_c-x_d)p) \quad (6)$$

where $K_o$ is a constant.

The output of multiplier 85 is the phase B position control signal, which represents the demodulated "phase B" pickoff signal, as modified by the error signal as follows:

$$K_o \cos 2\pi x_d/p \sin 2\pi(x_c-x_d)/p \quad (7)$$

The "phase A" control signal is fed to driver amplifier 90 which generates a current drive signal to drive the "phase A" unit of magnetic actuator 12. Similarly, the "phase B" position control signal is fed to driver amplifier 91 which generates a current drive signal for the "phase B" actuator unit of magnetic actuator 12.

It is to be noted that there must be some error signal $(x_c-x_d)$ to enable the generation of position control signals. This will be apparent from an inspection of equations (6) and (7), where it can be seen that if $x_c-x_d$ goes to zero, the control signals will also go to zero. The magnitude of the error signal is dependent on the demand presented by the control signal and the response of the servo loop. With a small error signal, it can be seen that the magnetic actuator will be driven by signals having a relatively small amplitude. on the other hand, with relatively large acceleration commands, as would generally be encountered in plotting data, error signals having large amplitudes are developed to provide control currents of high amplitude to the actuator. These control currents of high amplitude provide the needed drive to rapidly position the actuator so as to rapidly reduce the error to zero. As the actuator approaches the desired displacement, the amplitude of the error signals decreases, thereby insuring that the head will stop at the desired position.

By virtue of its closed loop servo control, the system thus is capable of providing rapid and accurate response to command signal inputs. It is to be noted that, in the case of an *x-y* plotter, the system is generally experiencing changes of direction and velocity at successive instants of time so that the ability to respond accurately to such accelerating commands is essential. The closed loop control system of this invention thus provides excellent response characteristics for this type of device.

Figure 5:
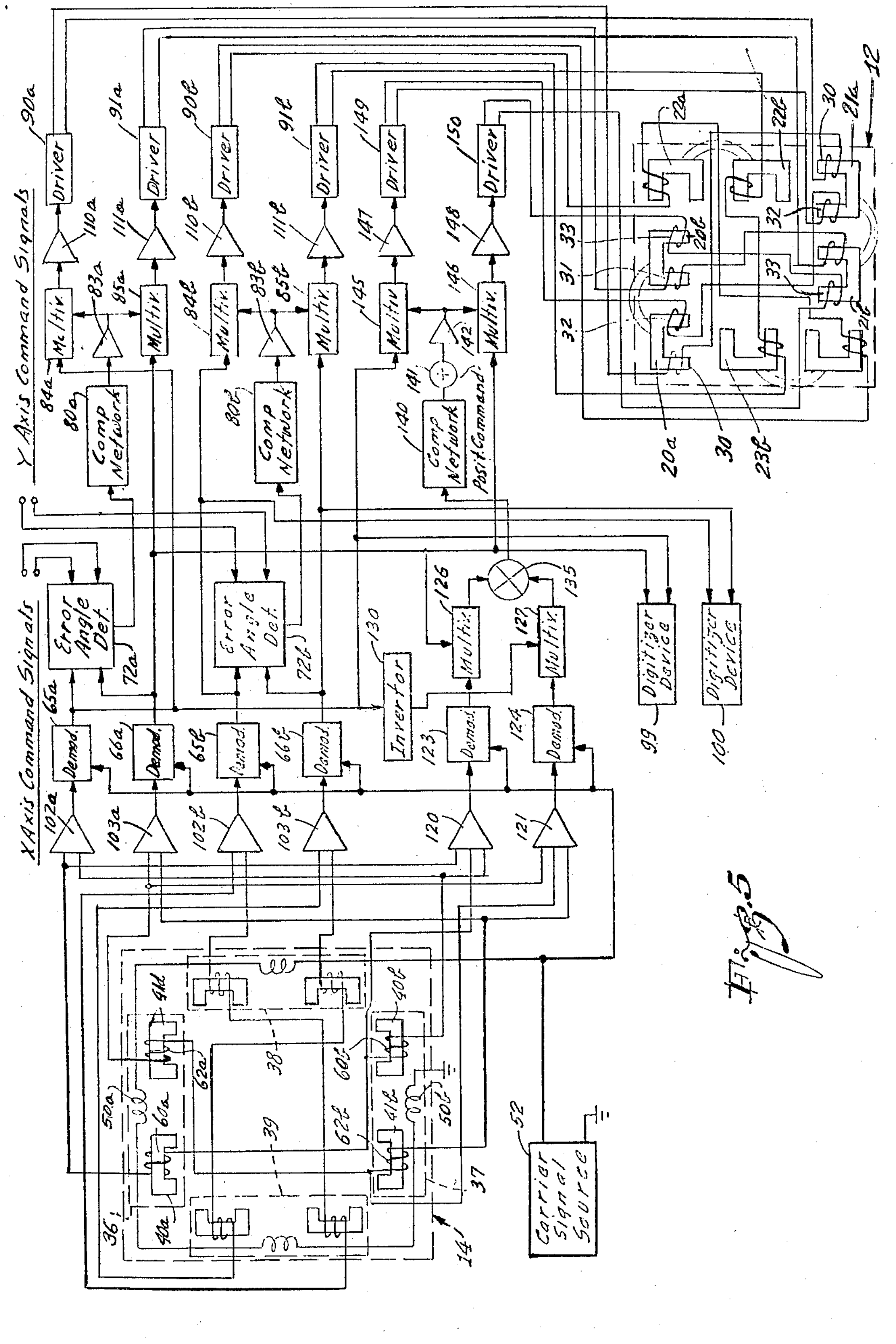
FIG. 5 is a schematic drawing illustrating a closed loop system for controlling the movements of the head along two coordinate axes and for preventing rotation of the head.

Referring now to FIG. 5, a schematic drawing of one embodiment of a complete two-axis control system is shown. This embodiment additionally includes a control for preventing rotation about an axis substantially perpendicular to a surface including the X and Y axes. It is to be noted that the control systems for each of the two axes are substantially the same. The *x* axis control system will first be described, like numerals being utilized to identify like components of FIG. 4.

Pickoff unit 14 includes two pairs of pickoffs 40*a*, 41*a*, and 40*b*, 41*b*. The pickoffs receive a carrier signal excitation from carrier signal source 52 through excitation coils 50*a* and 50*b* respectively. Pickoffs 40*a*, 40*b* and 41*a* and 41*b* located on opposite sides of the pickoff unit are used to average out pickoff errors which might result from inadvertent rotation of the unit about an axis substantially normal to a plane formed by the *x*-axis and the *y*-axis. The coils 60*a* and 60*b* of pickoffs 40*a* and 40*b* respectively are connected in series, the ends of this series connection being fed to summing amplifier 102*a*. This amplifier includes scaling circuits whereby the input signals are summed and divided by two to generate an output signal in accordance with the average therebetween. In this manner, rotation errors in the pickoff signal are averaged out to provide an indication of the displacement of the actuator along the *x*-axis.

The output of amplifier 102*a* is demodulated in demodulator 65*a* and processed with the x-axis command signal in error angle detector 72*a* as described in connection with FIG. 4. Compensation is provided for the servo loop by means of compensation network 80*a*, the output of the compensation network being amplified by means of amplifier 83*a* and multiplied by the phase A and phase B pickoff signals in multipliers 84*a* and 85*a* respectively. The outputs of multipliers 84*a* and 85*a* are amplified by means of amplifiers 110*a* and 111*a*, the outputs of these two amplifiers being fed to associated drivers 90*a* and 91*a* respectively.

The output of driver 90*a* is utilized to provide a drive signal for the coils 30 of actuator members 20*a* and 21*a*, while driver 91*a* is utilized to provide a drive signal for the drive coils 31 of actuators 20*b* and 21*b*. The operation of the system in controlling position along a single axis has already been fully described in connection with FIGS. 1, 2*a*, and 4, and therefore need not be repeated here.

Control of the *y* axis actuator units 22*a*, 23*a* and 22*b*, 23*b* is effected in conjunction with pickoff units 38 and 39 in the same manner as just described for the *x* axis. Actuator units 22*a*, 23*a*, 22*b*, 23*b* and the associated system components bear like numerals to those just described for the *x*-axis. However, in each instance the components for the *y*-axis are designated by the letter *b* rather than by the letter *a* as for the *x*-axis.

Referring again to FIG. 5, the anti-rotation circuit which operates to provide control for countering any tendency on the part of the head to rotate about an axis normal to the $x$ and $y$ axes will now be described. It is to be noted that, with the closed loop control, a separate control loop is needed to prevent rotation but need be utilized in conjunction with the pickoff and actuator units for only one of the positioning axes.

The pickoff coils 60*a* and 60*b* of pickoff units 40*a* and 40*b* respectively are connected in series with the opposite ends of the coils and their commonly connected portions are fed to differential amplifier 120. The series connection between the coil 60*a* and 60*b* is also connected to the differential amplifier 120 to provide a reference potential, such as a ground potential, to the amplifier so that the amplifier can produce a signal representing the differential between the signals from the coils 60*a* and 60*b*. The amplitude of differential amplifier 120 thus represents the difference between the signals in the two pickoff coils as follows:

$$E_d \sin\omega t \; [\sin 2\pi\,(x+\Delta x)/p - \sin 2\pi\,(x-\Delta x)/p\,] \quad (8)$$

where $E_d \sin\omega t$ is the carrier signal fed to the pickoffs from carrier signal source 52, $(x+\Delta x)$ represents the movement of one of the pickoff units 40*a* and 40*b* along the $x$ axis and $(x-\Delta x)$ represents the movement of the other pickoff unit along the $x$ axis. It is to be noted that the "$\Delta x$" increment ($\Delta x$) is that attributable to rotation of the pickoffs. In view of the opposite positioning of the two pickoff units utilized, the differential displacement resulting from rotation causes this differential displacement to be added to one pickoff unit of the pair and to be subtracted from the other pickoff unit of the pair.

The pickoff coils 62*a* and 62*b* of pickoff units 41*a* and 41*b* respectively are similarly connected such that the signals from these coils are fed to differential amplifier 121. As already noted, these signals are in quadrature relationship to the signals developed in pickoffs 40*a* and 40*b* so that they appear at the output of the amplifier 121 as follows:

$$E_d \sin\omega t \; [\cos 2\pi\,(x+\Delta x)/p - \cos 2\pi\,(x-\Delta x)/p\,] \quad (9)$$

The signals from the amplifiers 120 and 121 are demodulated in demodulators 123 and 124 respectively to remove the carrier component ($\sin\omega t$) therefrom. The outputs of demodulators 123 and 124 are recordingly represented by $\sin 2\pi\,(x+\Delta x)/p - \sin 2\pi\,(x-\Delta x)/p$ from the demodulator 123 and by $\cos 2\pi\,(x+\Delta x)/p - \cos 2\pi\,(x-\Delta x)/p$ from the demodulator 124.

It is well known that $\sin 2\pi\,(x+\Delta x)/p = \sin 2\pi x/p \cos 2\pi\Delta x/p + \cos 2\pi x/p \sin 2\pi\Delta x/p$ $\sin 2\pi\,(x-\Delta x)/p = \sin 2\pi x/p \cos 2\pi\Delta x/p - \cos 2\pi x/p \sin 2\pi\Delta x/p$ Therefore, $$\sin 2\pi\,(x+\Delta x)/p - \sin 2\pi(x-\Delta x)/p = \sin 2\pi x/p \cos 2\pi\Delta x/p + \cos 2\pi x/p \sin 2\pi\Delta x/p - (\sin 2\pi x/p \cos 2\pi\Delta x/p - \cos 2\pi x/p \sin 2\pi\Delta x/p = 2 \cos 2\pi x/p \sin 2\pi\Delta x/p \quad (10)$$

Similarly, $\cos 2\pi(x+\Delta x)/p = \cos 2\pi x/p \cos 2\pi\Delta x/p - \sin 2\pi x/p \sin 2\pi\Delta x/p$ $\cos 2\,(x-x)/p = \cos 2\,x/p \cos 2\,x/p + \sin 2\,x/p \sin 2\,x/p$ Therefore, $$\cos 2\pi(x+\Delta x)/p - \cos 2\pi(x-\Delta x)/p = \cos 2\pi x/p \cos 2\pi\Delta x/p - \sin 2\pi x/p.\ \sin 2\pi\Delta x/p - \cos 2\pi x/p \cos 2\pi\Delta x/p - \sin 2\pi x/p \sin 2\pi\Delta x/p = 2 \sin 2\pi x/p \sin 2\pi\Delta x/p \quad (11)$$

The output of demodulator 123 (equation 10) is fed to multiplier 126 where it is multiplied by the out of demodulator 66*a* which is the "cosine phase" position pickoff signal, this multiplicand being represented as follows:

$$2E_d \cos^2 2\pi x/p \sin 2\pi\Delta x/p \quad (12)$$

The output of demodulator 124 (equation 11) is multiplied in multiplier 127 with the inverse of the output of demodulator 65*a* which is the "sine phase" position pickoff signal, such inversion being accomplished by means of inverter 130 which multiplies the signal by (−1). The inversion is provided in the inverter 130 to convert the function represented by equation (11) into a positive function. The output of multiplier 126 is indicated by equation 13 as follows:

$$2E_d \sin^2 2\pi x/p \sin 2\pi\Delta x/p \quad (13)$$

The outputs of multipliers 126 and 127 represented by equations 12 and 13 are summed in summing device 135, the output of the summing device (after simplification of the trigonometric identities) being represented as follows:

$$2E_d \sin 2\pi\Delta x/p \quad (14)$$

This results from the fact that $$\sin^2 2\pi x/p + \cos^2 2\pi x/p = 1$$

The output of summing device 135 is in accordance with any rotation which may be experienced by the pickoff assembly. This output is fed to compensation network 140, which may provide conventional lead-lag type compensation to stabilize the servo loop. The output of compensation network 140 is introduced to rotation command stage 141, the output of which is amplified in amplifier 142 and fed to multipliers 145 and 146.

As shown in equation 14, the rotation signal is a trigonometric function of the $x$ axis displacement of the oppositely positioned pickoffs due to rotation. This rotation signal is multiplied in multiplier 145 with the sine phase pickoff signal from the demodulator 65*a* and in multiplier 146 with the cosine phase pickoff signal from the demodulator 66*a*. The outputs of multipliers 145 and 146 are amplified in amplifiers 147 and 148 respectively and fed to associated driver units 149 and 150.

The output of driver 149 is fed as an anti-rotation drive signal to the series connected windings 32 of actuator units 20a and 21a, while the output of driver 150 is fed to the series connected windings 33 of actuators 20*b* and 21*b*. Thus, whenever there is any tendency of the head to rotate, signals are fed through the servo loop to the $x$-axis actuator units to provide a magnetic force to counteract any such rotation tendency by providing an appropriate force couple on the head.

It is to be noted that anti-rotational control signals need be applied to the head for only one axis to achieve the desired end results. It is also to be noted that, with such anti-rotation control, it is not necessary to have two pairs of actuators or pickoffs for the axis in which the anti-rotation servo loop is not utilized. For the sake of symmetrical operation, it may be desirable, however, to utilize such additional actuators and pickoffs (as shown in FIG. 5 for the $y$-axis). It will be appreciated that the head may be moved manually along the $x$-axis or the $y$-axis or simultaneously along both axes and that the anti-rotation features described above may still be operative to inhibit rotation.

As in other plotters, the invention may be utilized as a "digitizer" to generate digital signals in response to the positioning of the head along the platen. This, of course, is useful in digitally encoding information for future utilization by manually tracing data which may be placed on the platen in the form of scribed figures, objects or the like.

Referring to FIGS. 4 and 5, as the magnetic pickoff unit 14 is moved along the platen magnetically derived signals in the general form of trigonometric (or "periodic") waves in quadrature relationship are developed in accordance with such movement. The portions of these signals representing $x$ axis movement are demodulated in demodulator 65*a* and 66*a* and fed to digitizer device 99, where they are placed in appropriate form for recording or for immediate utilization. Similarly, the $Y$ axis position signals are fed from demodulators 65*b* and 66*b* to digitizer device 100. The device thus is readily adaptable to utilization for generating control information by manually or automatically slewing the head along the platen to follow figures or the like whose shapes are to be encoded.

The apparatus described above has certain important advantages. It provides a head unit which is disposed in floating relationship to the platen and which is movable under its own power to any desired position relative to a platen. Although the head and the platen are disclosed as being planar, other configurations may be provided. farthermore, although the signals controlling the displacement of the head are described as being produced in accordance with a magnetic interrelationship between the head and the platen, other interrelationships than magnetic may be provided without departing from the scope of the invention. By providing the floating interrelationship between the head and the platen as discussed above, simultaneous and yet independent displacement of the head relative to the platen along a pair of coordinate axes may be provided.

The system constituting this invention provides actuator systems for controlling the displacement of the head relative to the platen and pickoff units are provided for sensing the displacement of the head. The signals from the pickoff units are used in these various embodiments to control the subsequent displacements of the head by the actuator units.

In one embodiment of the invention as shown in FIGS. 1, 2*a*, 2*b* and 3, the head and platen are planar and pickoff signals are provided for moving the head linearly relative to the platen along a single axis or a pair of coordinate directions. The pickoff signals may be combined in a particular relationship with drive signals representing force to control the subsequent movement of the head along the platen.

The motor arrangement shown in FIGS. 1, 2*a*, 2*b* and 3 has certain important advantages. The motor arrangement is provided with low power losses and with a substantially constant torque over a the motor range of speeds. The motor is also able to provide full torque over both starting and operating conditions. Thus, themotor has the advantages of a direct current motor whose field current is held substantially constant.

In a second embodiment of the invention, signals are provided to represent the desired displacement of the head relative to the platen along at least one axis. These signals are combined in a particular relationship with the pickoff signals to produce error signals. The error signals are used in a closed loop servo to control the operation of the actuator so that the actual displacement of the head along the particular axis corresponds to the desired displacement of the head along the particular axis. As disclosed above, this closed loop servo system is also adapted to produce simultaneous and yet independent displacements of the head along a pair of coordinate axes.

The system constituting this invention also provides compensation to prevent any undesired rotation of the head about an axis substantially perpendicular to a surface including the pair of coordinate axes. This is accomplished by comparing the displacements of at least one pair of spaced pickoffs along one of the coordinate axes and by using any difference between the displacements of such pickoffs to produce an error signal. The error signal is used in a closed loop servo to operate at least one of the actuators to compensate for any rotation of the head.

The system constituting this invention causes the head to be moved with considerably increased speeds and accuracy relative to any plotting members of the prior art. For example, applicant's licensee has constructed a head which weighs approximately only thirty (30) ounces. applicant's licensee has been able to move this head relative to a drafting table at speeds of thirty (30) inches per second along a pair of coordinate axes and to accelerate the head at 1g per second squared so that images controlled by a program on a tape are duplicated with very fine accuracies in spite of such extreme speeds.

The system of this invention thus provides a highly accurate and efficient means for controlling the movement of a magnetic actuator along a platen as well as generating digital signals representing data placed on this platen.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination, a platen having a planar configuration and having a plurality of poles disposed at spaced positions along a particular axis, first pickoff means having poles disposed relative to the poles on the platen to move along the particular axis relative to the platen and to generate a first periodic function in accordance with the movement of the poles on the first pickoff means along the particular axis relative to the poles on the platen, second pickoff means having poles disposed relative to the poles on the platen to move along the particular axis relative to the platen and disposed relative to the first pickoff means to generate a second periodic function in accordance with the movement of the poles on the second pickoff means along the particular axis relative to the poles on the platen, means responsive to the generation of the first periodic function in accordance with the movement of the first pickoff means along the first particular axis relative to the platen for generating signals representing the first periodic function, means responsive to the generation of the second periodic function in accordance with the movement of the second pickoff means along the second particular axis relative to the platen for generating signals representing the second periodic function, first actuator means having poles disposed relative to the poles on the platen to move along the particular axis relative to the platen and operatively coupled to the first and second pickoff means, the first actuator means being responsive to the signals representing the first periodic function for producing forces for driving the first and second pickoff means in accordance with the characteristics of such signals, second actuator means having poles disposed relative to the poles on the platen to move along the particular axis relative to the platen and operatively coupled to the first and second pickoff means, the second actuator means being responsive to the signals representing the second periodic function for producing forces for driving the first and second pickoff means in accordance with the characteristics of such signals, and means responsive to the signals generated by the first and second pickoff means for controlling the operation of the actuator means to prevent the pickoff means and the actuator means from rotating about an axis substantially normal to a surface including the particular axis.

2. In the combination set forth in claim 1, the poles on the first pickoff means having a particular relationship to the poles on the platen relative to the poles on the second pickoff means and the poles on the first actuator means having the particular relationship to the poles on the platen relative to the poles on the second actuator means.

3. In the combination set forth in claim 2, the poles on the first and second pickoff means being magnetic and the first and second signal-producing means respectively including windings on the poles of the first and second pickoff means, the poles of the actuator means constituting permanent magnets and the first and second actuator means respectively including windings on the poles of the actuator means.

4. In combination, a platen having a first plurality of poles disposed at spaced positions along a first particular axis and having a second plurality of poles disposed at spaced positions along a second particular axis, first pickoff means having a plurality of poles disposed relative to the first plurality of poles on the platen to sense the position of the first plurality of poles on the platen relative to the plurality of poles on the first pickoff means along the first particular axis and to generate first periodic signals in accordance with progressive displacements between the poles on the first pickoff means and the poles on the platen along the first particular axis, second pickoff means operatively coupled to the first pickoff means for movement with the first pickoff means and having a plurality of poles disposed relative to the second plurality of poles on the platen to sense the position of the second plurality of poles on the platen relative to the plurality of poles on the second pickoff means along the second particular axis and to generate second periodic signals in accordance with progressive displacements between the poles on the second pickoff means and the poles on the platen along the second particular axis, first actuator means operatively coupled to the first and second pickoff means and having a plurality of poles disposed relative to the poles of the first pickoff means and responsive to the periodic signals generated by the first pickoff means and having characteristics of being energized to drive the first and second pickoff means along the first particular axis in accordance with such periodic signals, second actuator means operatively coupled to the second pickoff means and having a plurality of poles disposed relative to the poles of the second pickoff means and responsive to the periodic signals generated by the second pickoff means and having characterisitics of being energized to drive the first and second pickoff means along the second particular axis in accordance with such periodic signals, third pickoff means having a plurality of poles in a particular relationship to the poles on the first pickoff means and disposed relative to the first plurality of poles on the platen to sense the position of the first plurality of poles on the platen relative to the plurality of poles on the third pickoff means along the first particular axis and to generate third periodic signals in accordance with progressive displacements between the poles on the third pickoff means and the first plurality of poles on the platen along the first particular axis, third actuator means operatively coupled to the first, second and third pickoff means and having a plurality of poles disposed relative to the poles of the first pickoff means and responsive to periodic signals generated by the third pickoff means and having characteristics of being energized to drive the first, second and third pickoff means along the first particular axis in accordance with such periodic signals, means responsive to the periodic signals generated by the first and third pickoff means for combining such signals in a particular relationship to generate control signals representing any rotation of the first, second and third pickoff means and the first, second and third actuator means about an axis substantially normal to a surface including the first and second particular axes, and means responsive to the control signals generated by the last mentioned means for introducing such signals to the first and third actuator means to inhibit the rotation of the first and second pickoff means and the first and second actuator means about the axis substantially normal to the surface including the first and second particular axes.

5. The combination set forth in claim 4 wherein the platen is magnetic and the first and second pickoff means and the first and second actuator means have magnetizable properties.

6. A closed loop control system for controlling the positioning of an actuator along a particular axis on a platen constructed to provide a periodic function along the particular axis, including:

first and second pickoff means disposed in a particular phase relationship to each other and to the periodic function of the platen and connected to the actuator and movable therewith and disposed relative to the platen for generating first and second periodic signals having the particular phase relationship to each other in accordance with the positioning of said pickoff means relative to each other and to the periodic function of said platen along said particular axis on said platen, means for providing first and second command signals having the particular phase relationship representing the desired positioning of said actuator along said particular axis on said platen, means for comparing the output of said pickoff means with said command signals to produce error signals representing differences between the desired and actual displacements of the pickoff means relative to the platen along the particular axis, said error signal means including a first multiplier responsive to the first pickoff and command signals for producing a first multiplication signal and further including a second multiplier responsive to the second pickoff and command signals for producing a second multiplication signal and further including a summer responsive to the first and second multiplication signals for producing the error signals, means including a third multiplier responsive to the error signals and the first pickoff signals for multiplying the error signals and the first signals from the first pickoff means for producing first position control signals for controlling the operation of said actuator, means including a fourth multiplier responsive to the error signals and the second pickoff signals for multiplying the error signals and the second signals from the second pickoff means for producing second position control signals for controlling the operation of said actuator, and means responsive to said first and second position control signals for driving said actuator along said particular axis relative to said platen in response to said first and second position control signals.

7. The system of claim 6 wherein said platen is a magnetic grid and wherein said pickoff means comprise a pair of magnetic pickoffs having pole faces with dimensions related to the dimensions of said magnetic grid, the pole faces of said pickoffs being positioned over said platen in spaced quadrature phase relationship with each other.

8. A closed loop system including:

a platen constructed to provide a periodic function along each of first and second coordinate axes, first and second actuator means having a particular phase relationship along the first coordinate axes for cooperating with the platen to provide a movement along the first particular axis relative to the platen, third and fourth actuator means having the particular phase relationship along the second coordinate axis for cooperating with the platen to provide a movement along the second particular axis relative to the platen, first and second pickoff means movable with the first and second actuator means and disposed in the particular phase relative to each other along the first coordinate axis and relative to the platen for respectively generating first and second periodic signals in accordance with the positioning of said first and second pickoff means along said first particular axis relative to the periodic function of said platen along said first particular axis, third and fourth pickoff means movable with the third and fourth actuator means and disposed in the particular phase relative to each other along the second coordinate axis and relative to the platen for respectively generating third and fourth periodic signals in accordance with the positioning of said third and fourth pickoff means along said second particular axis relative to the periodic function of said platen along said second particular axis, first command signal means for providing first and second command signals having the particular phase relationship and representing the desired positioning of said first and second actuator means and said first and second pickoff means along said first particular axis relative to said platen, second command signal means for providing third and fourth command signals representing the desired positioning of said third and fourth actuator means and said third and fourth pickoff means along said second particular axis relative to said platen, first error signal means for comparing the signals from said first pickoff means and said first command signals and from said second pickoff means and said second command signals to produce first error signals representing any differences between the desired and actual positioning of the first and second actuator means relative to the platen along the first particular axis, the first error signal means including a first multiplier responsive to the firt pickoff and command signals for producing first multiplication signals and further including a second multiplier responsive to the second pickoff and command signals for producing second multiplication signals and further including a first summer responsive to the first and second multiplication signals for producing the first error signals, first means including a third multiplier responsive to the first error signals and the signals from the first pickoff means for multiplying the first error signals and the signals from the first pickoff means for producing first periodic position control signals for controlling the operation of the first actuator means, means for driving said first actuator means along said first axis in accordance with the characteristics of said first periodic position control signals, second means including a fourth multiplier responsive to the first error signals and the signals from the second pickoff means for multiplying the first error signals and the signals from the second pickoff means for producing second periodic position control signals for controlling the operation of said second actuator means, means for driving the second actuator means along the second axis in accordance with the characteristics of said second periodic position control signals, second error signal means for comparing the signals of said third pickoff means and said third command signals and from said fourth pickoff means and said fourth command signals to produce second error signals representing any differences between the desired and actual positioning of the third and fourth actuator means relative to the platen along the second particular axis, the second error signal means including a second multiplier responsive to the third pickoff and command signals for producing fifth multiplication signals and further including a sixth multiplier responsive to the fourth pickoff and command signals for producing sixth multiplication signals and further including a second summer responsive to the fifth and sixth multiplication signals for producing the second error signals, third means including a seventh multiplier responsive to the second error signals and the signals from the third pickoff means for combining the second error signals and the signals from the third pickoff means for producing third periodic position control signals for controlling the operation of the third actuator means, means for driving said third actuator means along said second particular axis in accordance with the characteristics of said third periodic position control signals, fourth means including an eighth multiplier responsive to the second error signals and the signals from the fourth pickoff means for combining the second error signals and the signals from the fourth pickoff means for producing fourth periodic position control signals, and means for driving said fourth actuator means along said second particular axis in accordance with the characteristics of said fourth periodic position control signals.

9. The system set forth in claim 8, wherein said platen is a magnetic grid defining the periodic functions along the first and second axes and wherein said first and second pickoff means comprise a pair of magnetic pickoffs disposed along said first particular axis in the particular phase relationship and each having pole faces in a second particular phase relationship to the pole faces of the other magnetic pickoff in the pair and wherein said third and fourth pickoff means comprise a pair of magnetic pickoffs disposed along said second particular axis in the particular phase relationship and each having pole faces in the second particular phase relationship to the pole faces of the other magnetic pickoff in the pair.

10. A closed loop system including:

a platen constructed to provide a periodic function along each of first and second coordinate axes, first actuator means for providing a movement along the first particular axis relative to the platen, second actuator means for providing a movement along the second particular axis relative to the platen where the second particular axis is coordinate with the first particular axis, first pickoff means movable with the first and second actuator means and disposed relative to the platen for generating first periodic signals in accordance with the positioning of said first pickoff means along said first particular axis relative to the periodic function of said platen along said first particular axis, second pickoff means movable with the first and second actuator means and disposed relative to the platen for generating second periodic signals in accordance with the positioning of said second pickoff means along said second particular axis relative to the periodic function of said platen along said second particular axis, means for providing first command signals representing the desired positioning of said first and second actuator means and said first and second pickoff means along said first particular axis relative to said platen, means for providing second command signals representing the desired positioning of said first and second actuator means and said first and second pickoff means along said second particular axis relative to said platen, means for comparing the signals from said first pickoff means and said first command signals to produce first error signals representing any differences between the desired and actual positioning of the first and second actuator means relative to the platen along the first particular axis, first means for multiplying the first error signals and the signals from the first pickoff means for producing first periodic position control signals for controlling the operation of the first actuator means, means for driving said first actuator means along said first axis in accordance with the characteristics of said first periodic position control signals, means for comparing the output of said second pickoff means and said second command signals to produce second error signals representing any differences between the desired and actual positioning of the first and second actuator means relative to the platen along the second particular axis, second means for combining the second error signals and the signals from the second pickoff means for producing second periodic position control signals for controlling the operation of the second actuator means, means for driving said second actuator means along said second particular axis in accordance with the characteristics of said second periodic position control signals, wherein each of said first and second pickoff means includes means for generating a pair of pickoff signals having a particular phase difference and having a trigonometric function related to the positioning of said pickoff means along its particular axis relative to the platen and said means for providing command signals along each axis includes means for generating a pair of command signals having the particular phase difference and having a trigonometric function related to the desired positioning of said pickoff means along said platen, said first comparing means for generating the first error signals including means for generating a first pair of error signals having a trigonometric function and having the particular phase difference and having characteristics in accordance with any difference between the associated pickoff and command signals in the pair, said second comparing means for generating the second error signals including means for generating a second pair of error signals having a trigonometric function and having the particular phase difference and having characteristics in accordance with any difference between the associated pickoff and command signals in the pair, said first means for producing the first position control signals including means for multiplying individual ones of the pair of pickoff signals from the first pickoff means and individual ones of the first pair of error signals to generate a first pair of position control signals having the particular phase difference, and said second means for producing the second position control signals including means for multiplying individual ones of the pair of pickoff signals from the second pickoff means and individual ones of the second pair of error signals to generate a second pair of pickoff signals.

11. The system set forth in claim 10, including, said pickoffs in said first and second pickoff means generating said pickoff signals at least in part in accordance with the rotation of said pickoffs, means responsive to said pickoff signals from the pickoffs at least a particular one of said first and second pickoff means for deriving additional position control signals in accordance with any difference between the outputs of said pickoffs as a result of any rotation of said pickoffs, and means responsive to the additional pickoff control signals for obtaining an operation of at least the particular one of the actuator means associated with the particular one of the pickoff means in accordance with such additional position control signals to inhibit rotation of the first and second pickoff means and the first and second actuator means about an axis substantially normal to a surface including the first and second particular axes.

12. In a closed loop control system, a platen constructed to define first and second energy levels in a periodic relationship along a particular axis, a head movable relative to the platen and disposed in contiguous relationship to the platen, first and second actuator means disposed on the head in a particular phase relationship to each other and to the platen and constructed to provide a movement of the head along the particular axis relative to the platen, first and second pickoff means disposed on the head in a particular phase relationship to each other and to the platen and connected to the actuator means and movable with the head and disposed relative to the platen for respectively generating first and second signals in accordance with the linear positioning of said pickoff means along the particular axis relative to said platen, said first and second pickoff means being disposed at opposite sides of the head relative to the first particular axis, means responsive to the signals from the first and second pickoff means for respectively deriving control signals from said oppositely positioned pickoff units in accordance with any difference between the characteristics of the signals from the pickoff means, means for combining in a particular relationship the control signals and the signals generated by said first and second pickoff means to produce anti-rotation control signals, the combining means including a first multiplier responsive to the control signals and the signals generated by the first pickoff means for generating first multiplication signals and including a second multiplier responsive to the control signals and the signals generated by the second pickoff means for generating second multiplication signals and further including a summer for adding the first and second multiplication signals to produce the anti-rotation control signals, and means for energizing said first and second actuator means in response to said anti-rotation control signals to inhibit rotation of said head relative to said platen about an axis substantially normal to a surface including the particular axis, said energizing means including a third multiplier responsive to said anti-rotation control signals and said first pickoff signals for generating third multiplication signals and including a fourth multiplier responsive to said anti-rotation control signals and said second pickoff signals for generating fourth multiplication signals and further including means responsive to said third and fourth multiplication signals for introducing said third and fourth multiplication signals respectively to said first and second actuation means to inhibit rotation of the head relative to the platen about the axis substantially normal to the surface including the particular axis.

13. In a system for providing a controlled relative movement between two members along first and second coordinators, the combination of:

a first member constructed to define a periodic function along each of first and second coordinate axes, a second member disposed relative to the first member for simultaneous and yet independent displacement between the first and second members along each of the first and second coordinate axes relative to the displacement between the first and second members along the other coordinate axes, first means for providing first command signals representing the desired movement of the second member relative to the first member along the first axis, second means for providing second command signals representing the desired movement of the second member relative to the first member along the second axis, third means disposed on the second member to provide first periodic pickoff signals representing the actual movement of the second member relative to the periodic function defined by the first member along the first axis, fourth means disposed on the second member relative to the first means to provide second periodic pickoff signals representing the actual movement of the second member relative to the periodic function defined by the first member along the second axis, fifth means responsive to the first command and pickoff signals for producing first error signals in accordance with any differences between such command and pickoff signals, sixth means for multiplying the first error signals and the first pickoff signals to produce first periodic position control signals controlling the movement of the second member relative to the first member along the first particular axis, seventh means responsive to the first periodic position control signals for obtaining a movement of the second member relative to the first member along the first axis in accordance with the characteristics of the first periodic position control signals, eighth means responsive to the second command and pickoff signals for producing second error signals in accordance with any difference between such command and pickoff signals, ninth means for multiplying the second error signals and the second pickoff signals to produce second periodic position control signals controlling the movement of the second member relative to the first member along the second axis, and tenth means responsive to the second periodic position control signals for obtaining a movement of the second member relative to the first member along the second axis, simultaneously with the movement of the second member relative to the first member along the first axis, in accordance with the characteristics of the second periodic position control signals.

14. The system set forth in claim 13, including eleventh means responsive to the first pickoff signals for inhibiting rotation of the second member relative to the first member about an axis transverse to a surface including the first and second coordinate axes, the first and second members being planar and being disposed in contiguous relationship to each other.

15. In the system set forth in claim 13, the other one of the first and second members having magnetic properties and the third and fourth means being provided with magnetizable properties for cooperating with the other one of the first and second members to provide the first and second periodic pickoff signals representing the relative movements between the first and second members along the first and second axes and the seventh and tenth means being provided with magnetizable properties for cooperating with the other one of the first and second members to obtain the desired movement of the second member relative to the first member respectively along the first and second axes.

16. In a system for providing a controlled relative movement between two members along a particular axis, the combination of:

a first member constructed to provide first and second energy levels on a periodic basis along the particular axis, a second member disposed relative to the first member for displacement between the first and second members along the particular axis, first means for providing first and second signals having the periodic relationship and a particular phase relationship and representing a desired displacement between the first and second members along the particular axis, second means movable with the second member relative to the first member for providing first and second signals having the periodic relationship and a particular phase relationship to each other and to the periodic energy level on the first member and representing an actual displacement between the first and second members along the particular axis, third means operatively coupled to a particular one of the first and second members for obtaining a displacement between the first and second members along the particular axis, first servo means operatively coupled to the first and second means for producing a displacement of the second member relative to the first member along the particular axis in accordance with any difference between the desired and actual displacements of the second member relative to the first member along the particular axis, the first servo means including a first multiplier responsive to the first signals from the first and second means for producing a first multiplication signal and further including a second multiplier responsive to the second signals from the first and second means for producing a second multiplication signal and further including an adder responsive to the first and second multiplication signals for producing error signals and further including means responsive to the error signals for introducing such signals to the third means to obtain a displacement of the second member relative to the first member in accordance with such error signal, and second servo means operatively coupled to the second means for inhibiting rotation of the second member relative to the first member about an axis substantially perpendicular to a surface defined by the particular axis, the second servo means including means responsive to the first and second signals from the pickoff means for providing control signals representing any differences between such signals and further including a third multiplier responsive to the control signals and the signals from the first pickoff means for providing third multiplication signals and further including a fourth multiplier responsive to the control signals and the signals from the second pickoff means to provide fourth multiplication signals and further including a second adder responsive to the third and fourth multiplication signals for providing anti-rotation signals and further including means responsive to the anti-rotation signals for introducing such signals to the third means to obtain corrections in the displacement between the first and second members to inhibit any rotation of the second member relative to the first member about the axis substantially perpendicular to the surface defined by the particular axis.

17. In a system as set forth in claim 16, the first member being in the form of a magnetic grid and the second member being provided with magnetizable properties to cooperate with the magnetic grid in providing an actual displacement between the first and second members along the particular axis and the third means including magnetizable means cooperative with the magnetic grid for producing a displacement of the second member relative to the first member along the particular axis and the first means including magnetizable means cooperative with the magnetic grid for providing an indication of the actual displacement between the first and second members along the particular axis.

18. In a system as set forth in claim 16, the first and second members being planar and being disposed in contiguous relationship to each other, the third means including first and second actuating means having the particular phase relationship to each other and respectively responsive to the first and second signals from the pickoff means to provide a displacement of the second member relative to the first member along the particular axis.

19. In a system for providing a controlled relative movement between two members along first and second coordinate axes, the combination of:

a first member, a second member disposed in spaced but contiguous relationship to the first member for simultaneous and yet independent displacement between the first and second members along each of the first and second coordinate axes relative to the displacement between the first and second members along the other one of the first and second coordinate axes, first means for indicating a desired displacement of the second member relative to the first member along the first coordinate axis, second means for indicating a desired displacement of the second member relative to the first member along the second coordinate axis, first servo means responsive to the desired displacement indicated by the first means and operable on a closed loop basis for producing the desired displacement of the second member relative to the first member along the first coordinate axis, second servo means responsive to the desired displacement indicated by the second means and operable on a closed loop basis for producing the desired displacement of the second member relative to the first member along the second coordinate axis, and third servo means operable on a closed loop basis for preventing rotation of the second member relative to the first member about an axis substantially perpendicular to a surface defined by the first and second coordinate axes.

20. In a system as set forth in claim 19, the first member being provided in the form of a grid having axes corresponding to the first and second axes and the first and second means respectively providing an indication of the desired displacement of the second member relative to the first member along the first and second coordinate axes of the grid and the first and second servo means respectively including means for providing an indication of the actual displacements of the second member relative to the first member along the first and second coordinate axes and further including first and second control means responsive to the indications of the actual and desired displacements of the second member relative to the first member along the first and second coordinate axes for producing controlled displacements between the first and second members along the first and second coordinate axes in accordance with any differences between the actual and desired displacements.

21. In a system as set forth in claim 20, the first and second members being planar and being disposed in contiguous relationship to each other and the first control means being responsive to the indications representing the actual displacement along the first coordinate axis and the difference between the actual and desired displacements along the first coordinate axis for producing the controlled displacements between the first and second members along the first coordinate axis and the second control means being responsive to the indications representing the actual displacement along the second coordinate axis and the difference between the actual and desired displacements along the second coordinate axis for producing the controlled displacements between the first and second members along the second coordinate axis.

22. In a system as set forth in claim 21, the first member being magnetic and the first and second servo means respectively including first and second magnetic means disposed on the second member for cooperating with the first member to produce the desired displacements of the second member relative to the first member along the first and second coordinate axes.

23. A closed loop control system for controlling the positioning of an actuator along a particular axis on a platen constructed to provide a periodic function along the particular axis, including:

pickoff means connected to the actuator and movable therewith and disposed relative to the platen for generating periodic signals in accordance with the positioning of said pickoff means relative to the periodic function of said platen along said particular axis on said platen, means for providing command signals representing the desired positioning of said actuator along said particular axis on said platen, means for comparing the output of said pickoff means with said command signals to produce error signals representing differences between the desired and actual displacements of the pickoff means relative to the platen along the particular axis, means for multiplying the error signals and the signals from the pickoff means for producing position control signals for controlling the operation of said actuator, means for driving said actuator along said particular axis relative to said platen in response to said position control signals, and means responsive to said pickoff means for generating signals in accordance with any rotation of said actuator about an axis transverse to said platen, said rotation signals being introduced to said actuator to provide a drive force to said actuator to inhibit the rotation thereof about an axis substantially perpendicular to a surface including said particular axis.

24. A closed loop system including:

a platen constructed to provide a periodic function along each of first and second coordinate axes, first actuator means for providing a movement along the first particular axis relative to the platen, second actuator means for providing a movement along the second particular axis relative to the platen where the second particular axis is coordinate with the first particular axis, first pickoff means movable with the first and second actuator means and disposed relative to the platen for generating first periodic signals in accordance with the positioning of said first pickoff means along said first particular axis relative to the periodic function of said platen along said first particular axis, second pickoff means movable with the first and second actuator means and disposed relative to the platen for generating second periodic signals in accordance with the positioning of said second pickoff means along said second particular axis relative to the periodic function of said platen along said second particular axis, means for providing first command signals representing the desired positioning of said first and second actuator means and said first and second pickoff means along said first particular axis relative to said platen, means for providing second command signals representing the desired positioning of said first and second actuator means and said first and second pickoff means along said second particular axis relative to said platen, means for comparing the signals from said first pickoff means and said first command signals to produce first error signals representing any differences between the desired and actual positioning of the first and second actuator means relative to the platen along the first particular axis, first means for multiplying the first error signals and the signals from the first pickoff means for producing first periodic position control signals for controlling the operation of the first actuator means, means for driving said first actuator means along said first axis in accordance with the characteristics of said first periodic position control signals, means for comparing the output of said second pickoff means and said second command signals to produce second error signals representing any differences between the desired and actual positioning of the first and second actuator means relative to the platen along the second particular axis, second means for combining the second error signals and the signals from the second pickoff means for producing second periodic position control signals for controlling the operation of the second actuator means, means for driving said second actuator means along said second particular axis in accordance with the characteristics of said second periodic position control signals, means responsive to the signals from at least a particular one of said first and second pickoff means for generating signals having characteristics in accordance with any rotation of said first and second pickoff means and said first and second actuator means about an axis substantially perpendicular to a surface including the first and second axes, and means responsive to the signals from the last mentioned means for introducing such signals to at least a particular one of the first and second actuator means to provide a force to said particular one of said actuator means for inhibiting the rotation of said pickoff means and actuator means about the axis substantially perpendicular to a surface including the first and second particular axis.

* * * * *